United States Patent
Ito

Patent Number: 6,060,099
Date of Patent: May 9, 2000

[54] METHOD OF MAKING SOFT ICE CREAM ON A COMMERCIAL SCALE

[76] Inventor: Sadaharu Ito, 30-5 1-chome, Saginomiya Nakano-ku, Tokyo-to, Japan

[21] Appl. No.: 09/243,493

[22] Filed: Feb. 3, 1999

[30] Foreign Application Priority Data

Feb. 4, 1998 [JP] Japan .................................. 10-038151

[51] Int. Cl.⁷ .............................. A23C 9/14; A23C 3/00; B65B 55/00
[52] U.S. Cl. .......................... 426/243; 426/393; 426/524; 62/136; 62/349; 62/551
[58] Field of Search .................... 426/524, 234, 426/393, 565; 62/136, 349, 351; 99/452, 483, 451, 453

[56] References Cited

U.S. PATENT DOCUMENTS

| | | | |
|---|---|---|---|
| 2,925,347 | 2/1960 | Moser | 426/393 |
| 4,223,043 | 9/1980 | Johnson | 426/122 |
| 4,233,325 | 11/1980 | Slangan et al. | 426/107 |
| 4,926,020 | 5/1990 | Atwell et al. | 219/10.55 M |
| 5,256,436 | 10/1993 | Malone et al. | 426/565 |
| 5,403,611 | 4/1995 | Tomita et al. | 426/565 |

FOREIGN PATENT DOCUMENTS 11075701  9/1997  Japan .

*Primary Examiner*—Nina Bhat
*Attorney, Agent, or Firm*—Oblon, Spivak, McClelland, Maier & Neustadt, P.C.

[57] ABSTRACT

Pouring soft state ice cream as a precursor of hard state ice cream into a cone, cup or other shape made either one of paper, plastic resins or edible material and the thus poured ice cream is frozen to a hard state ice cream of −30° C. to −40° C. as it stands or wrapped within a plastic film and is held at −15° C. to −25° C., and the thus held ice cream is heated rapidly upto 0° C. to −8° C. by an electronic range upon request of a customer to be given to the customer without being touched by a person other than the customer so that it is held under very sanitary conditions.

12 Claims, 3 Drawing Sheets

METHOD OF MAKING SOFT ICE CREAM ON A COMMERCIAL SCALE

TECHNICAL FIELD

This invention relates to a method of producing soft ice cream as a final state from the hard state ice cream on a commercial scale.

BACKGROUND ART

This invention relates to a method of producing soft ice cream as a final state from the hard state ice cream on a commercial scale, and more particulately it relates to a method of producing a soft ice cream as a final state supplied from well equipped and sanitary facilities owned by specialized milk products makers or cake makers.

The soft state ice cream maintained at a temperature of −2° C. to −6° C. as a precursor of hard state ice cream is poured into a container made of paper, plastics or other edible container inclusive of pillow state bags, and the thus poured soft state ice cream is immediately frozen to a temperature of −30° C. to −40° C. and/or stored thereafter at −15° C. to −25° C. to become partly hard state ice cream, and then these ice creams are transported by a frozen transportation system to a frozen storage and maintained there.

Various containers filled with hard state ice creams and kept at the above-mentioned temperature are heated by the customer's request at a temperatures 0° C. to −8° C. to become soft ice cream.

Otherwise, each container of cone or cup filled one and further covered with pillow type container made of plastics used as outside packing purpose.

Each container filled with soft ice cream is further covered with pillow type container of outside packaging purpose.

DESCRIPTION OF THE PRIOR ART

1) Mixing

As main materials milk and milk products such as cream, condensed milk, butter and powdered milk, sugars such as milk sugar (lactose) and millet honey are further added with a stabilizer, emulsification agents, perfumes(spices) and with water and they are fully mixed in the heating tank kept at a temperature of 30° C. to 70° C.

Thus formed mixture are called mix.

2) Aging

The aforesaid mixture or mix is further heated at a temperature above 68° C. to fully sterilize them and thereafter they are cooled at 0° C. to 5° C. to store them, and during this period the water and fatty contents are made more minute to mix all the content to be fully mixed to be prepared for next step of freezing.

3) Freezing

The mix having finished the above-mentioned aging is transferred to a freezing step which is the most important step among other steps.

This freezing step is performed by a freezing and agitating machine called a freezer, and the main working of this apparatus is to pour the mix into a high speed rotary cylinder cooled from outside and injecting air thereinto and to mix all the content in the container, such as solid state, gaseous and the liquide states inclusive of air so as to be fully mixed.

4) Problems to be Solved by the Present Invention

The above-mentioned composition of the ice cream is called an ice cream composition, and so as to maintain this composition, soft state ice cream called a precursor, is frozen to −30° C. to −40° C. to change it to a hard state ice cream.

It is essential to keep the composition and rapid heating for hard state ice cream at −30° C. to −40° C. and to heat up to soft ice cream at a temperature 0° C. to −80° C.

Due to the fact that the temperature range of −2° C. to −6° C. where soft ice cream exists partly overlaps with the temperature range of −4° C. to −8° C. where the ice cream composition liable to decay.

In this regards general ice cream maker pour the soft state ice cream as a precursor into cups, cones,sticks, pillow type containers or other ones having various shapes and size and frozen them to −30° C. to −40° C. and store them somewhat higher temperature at −15° C. to −25° C. from economical point of view.

Accordingly, selling of ice cream is done by retail dealers at their store front by using small sized freezer, however, they are required to keep sanitary conditions by laws or regulations even their freezers are small sized. Due to this fact, most retail dealers are too cautious about the occurrence of the sanitary troubles and there was a fear that the supply of soft ice cream did not reach the increasing demand of ice cream, and this tendency was disclosed by the aforesaid Japanese Patent Application No.Hei 9-256266.

If the soft state ice cream as a precursor is frozen into hard state ice cream of −30° C. to −40° C. degree, it can be thermally stable but it must be heated to a temperature of −4° C. to −8° C. where it is liable to deformable.

In order to solve this difficult problem, the present invention has proposed to uniformly blow controlled air heated to a desired temperature about the hard state ice cream.

For this purpose, the Japanese Patent Application No.Hei 9-256266 has disclosed the method of heating the hard state ice cream to make it soften and pouring it into pillow type containers to supply them to the customers together with the method of air blowing around the hard state ice cream and filed a patent application, however, this method also needs considerable time and expenses and having economic problems to be solved.

As disclosed hereunder, the table showing favorable temparature for eating ice creams of so-called soft ice cream is to keep the ice cream at a temperature range 0° C. to −8° C.

SUMMARY OF THE INVENTION

Ordinary usage of electronic range are commonly well known in most homes and convenience stores.

Generally speaking, use of electronic range is directed to melt frozen foods and to cook them.

To melt the frozen food is considered, for example, to restore frozen raw fish to a raw fish of ordinary temperature and further to bring it to higher temperature of cooked state, for instance, in a gratin or the like.

It is considered to have much wider meaning to restore the frozen food for the purpose of transportation or to prevent decay in the state before freezing or further into cooked state.

These are relate to the phase change of water, that is, from solid state to liquid state and to gaseous state as hot steam.

The method of stored ice cream at −15° C. to −25° C. and then using a electronic range into soft ice cream 0° C. to −8° C. is not heating the ice cream to release the freezing state into a so-called mix of liquid state, but it relates only to a change of hardness due to change in temperature without causing any change in phase.

So this use of electronic ranges has never been experienced in the world.

BRIEF DESCRIPTION OF DRAWINGS

The invention will now be described by way of example and with reference to the accompanying drawings in which:

FIG. 1 shows another ways, after it has been frozen to hard state ice cream at −30° C. to −40° C. it is further stored at −15° C. to −25° C., then it is wrapped in a pillow type container and then it is heated by an electronic range at 0° C. to −8° C. to be supplied to the customers.

DETAILED DESCRIPTION OF THE INVENTION

EXAMPLE 1

As a Preliminary Test

Figure 1:
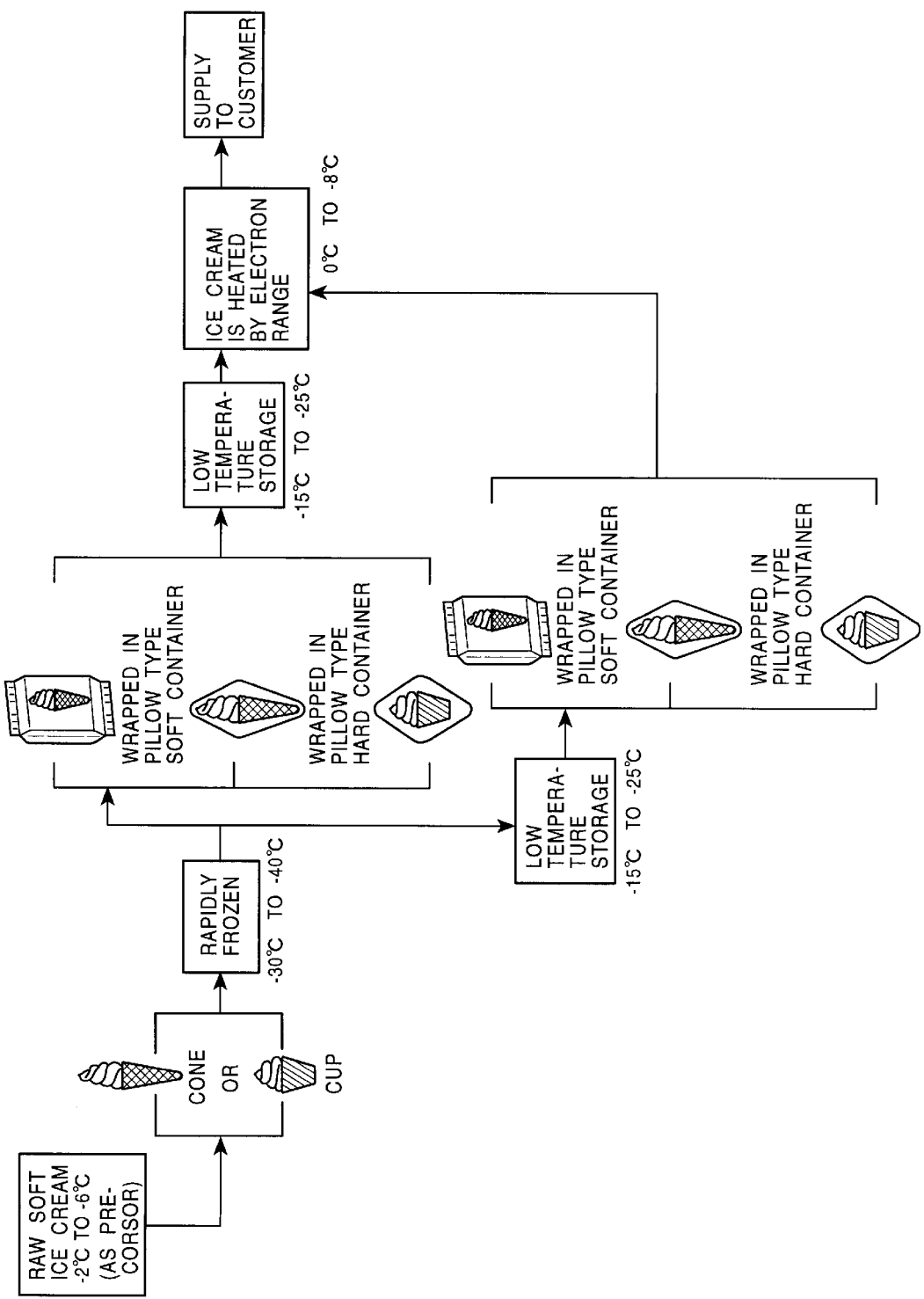
FIG. 1 is a plan view illustrating steps of using the first step of soft state ice cream as a precursor of hard state ice cream then it is poured into a cone or cup type container and then frozen to hard state ice cream, −30° C. to −40° C., next it is wrapped by a pillow type container, then stored at somewhat higher temperature of −15° C. to −25° C. and then heated by an electronic range at 0° C. to −8° C. to be supplied to the cu-stomers.

1) The outside part as well as the interior part of the hard state ice cream are heated by a electronic range in a very short period of time of a few to 15 seconds to change it to a soft ice cream without changing the composition, and this feature is the true meaning of the present invention.

Soft state ice cream as a precursor is frozen to hard state is then changed into a soft ice cream by using an electronic range without accompanying any change of composition, that is to say, changing hard state ice cream in an stable temperature zone to correctly heat up to a soft ice cream.

Prior to heating by using an electronic range, following table 1 shows the confirmation tests to decide favorable temperature zone of soft ice cream to a consumer's tongue.

This is a confirmation test to decide suitable temperature,

TABLE 1

| Heating temperature (mean value at three points at outer periphery and the center of the container) | feeling to the tongue | commercial name |
| --- | --- | --- |
| 0° C. to −3° C. | too soft | shake ice |
| −3° C. to −5° C. | slightly soft | soft cream |
| −5° C. to −7° C. | suitable | jellard inclusive yogurt |
| −8° C. to −10° C. | slightly hard | |
| −10° C. to −12° C. | hard and cool | |
| −13° C. to −15° C. | too hard | |

From the aforesaid table 1 for soft state ice cream, it is considered that the temperature range of −5° C. to −7° C. is the most favourable one to the consumer's tongue.

2) Apparatus and/or Equipment Used For the Above Example as Preliminary Tests

Hard state ice creams used for the above preliminary test were paper packed commercially sold lact ice cream, each one was labelled its capacity of 200 ml and the measured weight of 160 grams and stored in a freezer, storage controlled at −15° C. for more than 20 hours and then subjected to above-mentioned preliminary test.

Electronic Range: Commercially sold, with an output of 500 watts

Temperature measurement: JIS K type thermocouple

Measurement of Time: by using a commercial stop watch

Quantity of the ice creams was measured by using units of gram and 160 gram was made a basic weight, and when the actual weight was different from the basic weight, the ratio of the actual weight to the basic weight was used to control the treating time.

From the above-mentioned Table 1, it is observed that there is a decay of ice cream composition near the range of −5° C. to −7° C., and this temperature range is accepted by many customers and this range was stated as the most favorable temperature range for the customer's tongue.

From the results of various heating experiments, the inventor established the method to rapidly heat ice cream from the hard state ice cream to this most favourable temperature in front of the customer without changing the composition of the ice cream.

Micro wave radiated from the magnetron coupled to the electronic range is 2450 mega hertz of electro-magnetic wave thereby the molecules of the foods particularly the water contents of the foods begins to move violently due to the vibration of the electromagnetic wave and each water molecules are caused to make friction with each other and forced to generate heat.

Heating in the past was done from outside, but heating by electronic range is done by both the interior and the outer part of the foods thereby the foods can be heated uniform by both in the interior and the outside portion.

3) Experiments For Rapid Heating of the Hard State Ice Cream Using Electron Range

EXAMPLE 2

Ice cream was poured into a 200 ml container(160 gram weight) displayed following results shown by Table 2.

Table 2 (See next page)

| Experiment | A treating time (seconds) | B initial temp (° C.) | C heated temp (° C.) | D temp difference (° C.) | E = A/D time factor |
| --- | --- | --- | --- | --- | --- |
| 1 | 10 | −15.4 | −10.2 | 5.2 | 1.923 |
| 2 | 15 | −14.9 | −7.1 | 7.8 | 1.923 |
| 3 | 18 | −15.7 | −6.4 | 9.3 | 1.935 |
| 4 | 20 | −16.0 | −5.6 | 10.4 | 1.923 |
| | | | | mean | 1.931 |

In the table 2, initial temperature(B) is meant by that the temperature of the ice having been stored at the storaging container is placed into the electronic range, and the temperature difference(D) is the difference from the initial temperature(B) to that reached to the heating temperature and the time factor(E) is meant by the value obtained by dividing the value(A) by the value(D).

The less the value (E) is, the greater becomes the heating effect.

The time factor E=1.929±0.006

The less the variation from the mean value is, the less become the change of composition.

By using the time factor, we are able to find the treating time necessary for the arbitrary amount of ice cream to heating it up to the heated temperature.

To find the time necessary to heat 100 gram of test ice cream at the initial temperature of −15° C. upto the temperature of −5° C.

This ice cream under test must be the same as that used in the aforesaid ice cream and the initial temperature was about −15° C.

Necessary heating time(A)=time factor(E)×temperature difference(D)

1.931×(15° C.)×100 gram/160 gram=12.0≈12 seconds.

The shape of the paper cup is beside the problem, particularly the pillow type container can take many shapes such as having hollow conical type having some pattern, or frustoconical shape having at its upper and lower ends transverse flat portions, the whole body is circular or elliptical section and having at its one side a transverse flat portion.

The cross sectional shape is square or rectangular and having at its one side a blow out portion.

EXAMPLE 3

Although in Example 2 only 1 sample was used, however, in the Example 3, three pieces of sample were used to verify the uniformity of heating.

Condition of heating was the same as that used in Example 1 and the result was shown in Table.3.

TABLE 3

| Experi-ment | A (sec) heating time | B (° C.) initial temp | C (° C.) temperature | D (° C.) temp difference | E(A'/D) temp |
|---|---|---|---|---|---|
| 1 | 30 | −15.6 | −10.5 | 5.2 | 2.000 |
| 2 | 45 | −15.3 | −7.7 | 7.6 | 1.974 |
| 3 | 54 | −15.3 | −6.2 | 9.1 | 1.978 |
| 4 | 60 | −15.1 | −5.0 | 10.1 | 1.980 |
|  |  |  |  | mean | 1.983 |

A' = A ÷ 3 (pieces)

Effect of the Shape of Container

The container was rectangular at the corner and micro waves are liable to be concentrated at corners.

EXAMPLE 4

Liquefaction starts at the corners and the liquefaction and softening of the corner portions take place at about −5° C. and softening of the ice cream become very rapid as shown in Table 4.

TABLE 4

| Experi-iments | (sec) treat-ment | (° C.) initial temp | (° C.) heating up temp | E = (A/D) difference | condition time factor | at periphery |
|---|---|---|---|---|---|---|
| 1 | 10 | −15.8 | −10.5 | 5.3 | 1.887 | slightly soft |
| 2 | 15 | −15.2 | −6.7 | 8.5 | 1.768 | slightly liquefied |

TABLE 4-continued

| Experi-iments | (sec) treat-ment | (° C.) initial temp | (° C.) heating up temp | E = (A/D) difference | condition time factor | at periphery |
|---|---|---|---|---|---|---|
| 3 | 18 | −14.9 | −4.2 | 10.7 | 1.679 | liquefied region enlarged |
| 4 | 20 | −15.4 | −3.3 | 12.1 | 1.653 | liquefied region reached to the center |
|  |  |  |  | mean | 1.747 |  |

From the above-mentioned results, it is desirable for making soft ice cream from the hard state ice cream by using an electronic range to select a container having less corner portions.

EXAMPLE 5

Difference in time factor (E=(A/D)) depend on the kind and amount of milk fat in the ice cream.

Example 5 is a commercialy sold high grade ice cream contains 10% of milk fat were by using electronic range under Example 1, which result was shown in Table 5, listed below.

Having Conducted test using an electronic range by using a high class ice cream containing 10% of milk fat, result was shown in Table below.

TABLE 5

| Experi-iments | A (sec) treat-ing time | B (° C.) initial temp | C (° C.) raised temp | D (° C.) temp difference | E = (A/D) time factor |
|---|---|---|---|---|---|
| 1 | 10 | −15.6 | −12.4 | 3.2 | 2.53 |
| 2 | 15 | −15.3 | −7.5 | 5.8 | 2.59 |
| 3 | 18 | −14.9 | −8.1 | 6.8 | 2.65 |
| 4 | 20 | −15.5 | −7.5 | 8.0 | 2.50 |
|  |  |  |  | mean | 2.57 |

Generally, treating effect using electronic range for fat is low as compared with water.

Value of time factor E=(A/D) is lower than the other Example.

Due to the fact that high grade ice creams contain many animal fat than low fat ice cream, it can be considered that high grade ice cream prevent permeation of micro wave than low fat ice cream dose.

EXAMPLE 6

Making shake ice cream from the hard state ice cream by using electronic range accrding to the present invention.

Shake ice cream is meant by that it relates to the ice cream kept at the temperature −3° C. to 0° C.

Table is not shown for Example 6.

Namely, water content coexisting at both solid and liquid range but still retaining an ice cream composition.

According to the present invention using an electronic range, it is possible to make shake ice cream from the hard state ice cream only by adjusting the initial temperature, heating up time and so forth by each experiment.

In order to utilize the present invention, ordinary type of electronic ranges are available in most homes and convenience shops and can be used without needing any further expenditure so as to make gelid, to make soft ice cream or frozen yogurt, if the initial temperature is slightly over −15° C. the time for heating is 25 seconds and for making shake ice, at the longest heating time, 50 seconds would be enough to obtain a desired softness.

Ice creams are foods containing more than 70% water content, and a freezer used by the sole ice cream maker supplies the ice cream inclusive of ice in a micron type fine particles and in uniform composition.

This composition of ice cream is an important factor, and if this factor decays, ice as a kind of water is coarsened and if the air one of the important factors of the composition evaporates and impairs the taste of ice cream.

In soft ice cream, the temperature range for good taste is between −5° C. to −7° C. and the temperature range of −2° C. to −8° C. for unstable composition range, and these two ranges partly overlap with each other.

By heating up the partly hard ice cream kept at a temperature lower than −15° C. to soften it to −5° C. to −7° C. and thereby make into soft ice cream, it is necessary to heat up rapidly the ice cream and pass over the dangerous temperature range.

In the composition of ice cream, water content more than 70% is uniformly distributed as becoming fine particles of ice ranging 20 $\mu$m to 100 $\mu$m among the other composition.

It is possible to make soft ice cream from the hard state ice cream, if the hard state ice cream is heated to loosen the hard composition ice uniformly distributed in the composition while the ice changes into water.

The inventor of the present invention confirmed the above-mentioned fact by experiments.

The Soft Ice Creams Made Heretofore as Compared With Those Made by the Present Invention Soft state ice creams produced by the specialized ice cream makers by using ice cream making machine called freezers, are liable to decay its composition during the laps of time when they are transported to the customer.

Owing to this condition, aforesaid specialized ice cream makers immediately pour this soft state ice cream called as a precursor into cups, cones, sticks and bulk form and frozen to lower than −30° C. to make hard state ice creams and transport it to the shopping areas and supply them to the customer as hard ice cream.

However, on the market most ice cream makers do not supply the soft ice creams produced by freezers due to their unstable composition.

Almost all the soft ice creams supplied to the customer by retail dealers having small-sized freezers at their store and by purchasing raw material called mix from the specialized ice cream maker and making soft state ice cream.

This kind of soft ice cream, as compared with the hard state ice cream made and supplied to the customer by the specialized ice cream maker, have a few problems as shown by the following points due to the fact that they are not large scale products.

1) The price is high and variable, because there is no fixed price.
2) For the specialized ice cream maker strict guidance is set for the freezers by the government or other organizations, but freezers owned by retail dealers are not always sufficiently sanitary.
3) Hard state ice cream is regulated by Law(s) or Regulation(s) to its labelling, such as, representative of the products, names and the contents of the raw material, kind of the classified products names, for instance lact ice cream and so forth.

However, there is no Laws or Regulations for the soft ice cream sold in a store by retail dealers.

As compared to this, the soft state ice cream of this invention is produced by the specialized ice cream maker at first as a hard state ice cream under a mass production system packed and labelled with its shape, weight and capacity and then heated up by using an electronic range in front of the customer.

Accordingly, all the problems mentioned above can be overcomed fully and easily, and therefore it can contribute to enlarge the soft ice cream market now under increasing demand.

DESCRIPTION OF WORKING EXAMPLES

1) Working Example 1

Figure 2:
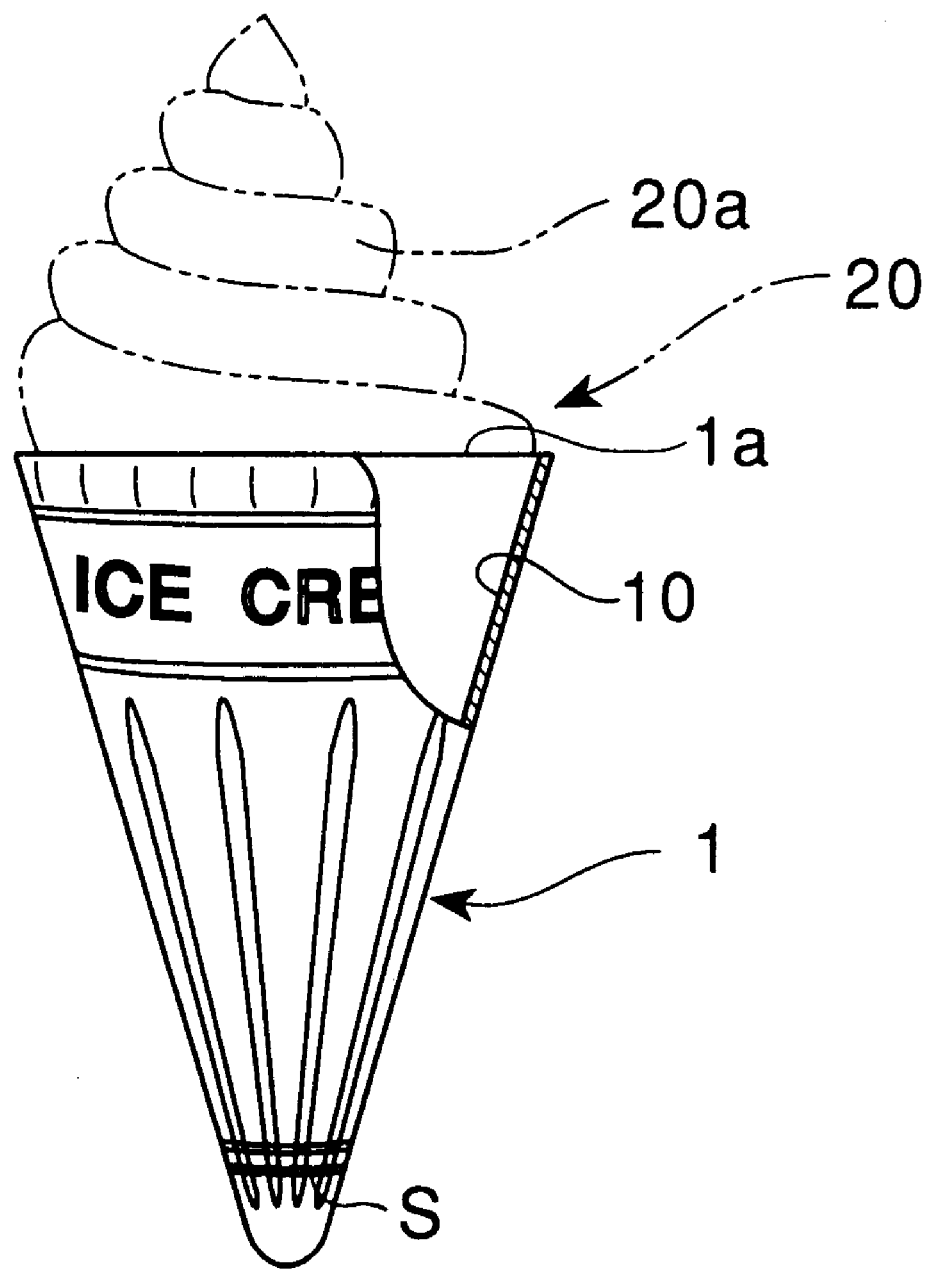
FIG. 2 is a side view showing the soft state ice cream having been poured into a conical cup 1.
Figure 3:
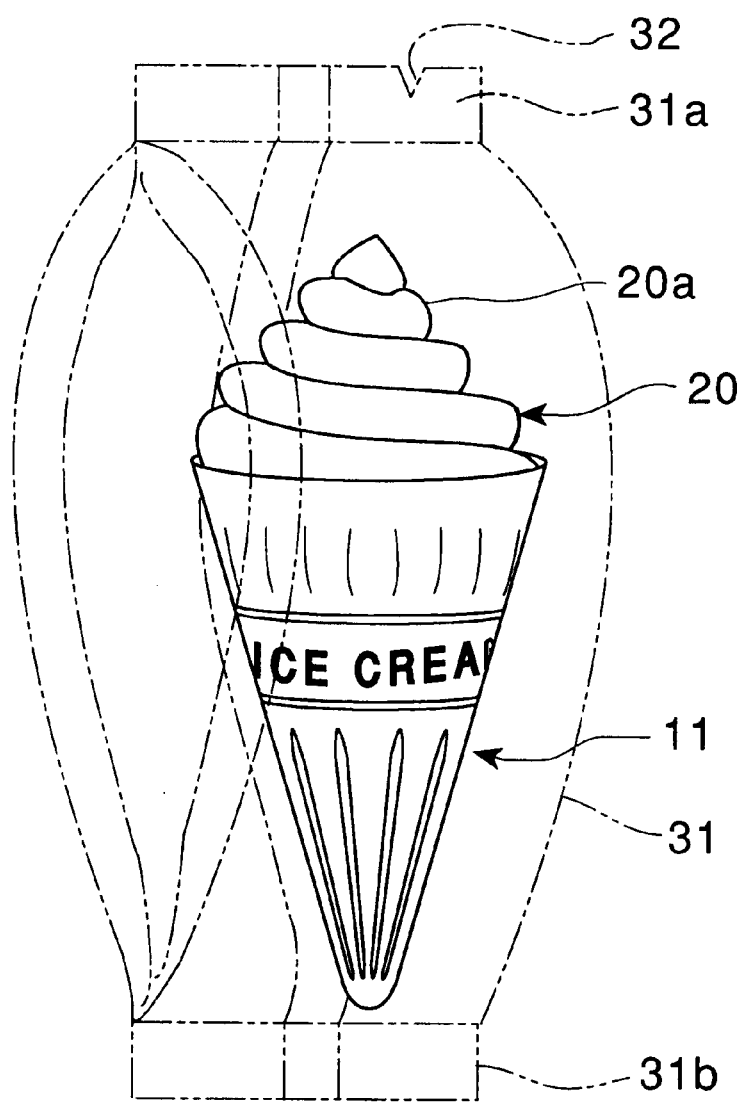
FIG. 3 is a side view showing that the outer part of the above-mentioned soft state ice cream is further wrapped in a pillow type container for the purpose of sanitary point of view to the customer.

Soft state ice cream as a precursor of hard state ice cream was poured into and above the upper border line 1a of the cone 1 composed of edible material as shown in FIG. 2 and the poured soft state ice cream is rapidly frozen to −30° C. to −40° C. and the portion poured above the upper border line 1a is shaped by a nozzle to have a helical form having narrowed top portion.

Thereafter, the thus formed frozen ice cream is stored at −15° C. to −25° C. and then heated up by using electronic range to temperature of 0° C. to −8° C. to a soft ice cream having two parts 10 and 20.

After eating the soft ice cream, it was found to have very good taste.

2) Working Example 2

The cone 10 poured with soft ice cream as a precursor was frozen to −30° C. to −40° C. was immediately covered by a pillow type container having two flat portions 31a and 31b transversed at the top and bottom ends.

It was confirmed that it was stored at somewhat higher temperature −15° C. to −25° C. to be kept in a shape after heating by the electronic range at 0° C. to −8° C. and was sufficient from the points of view of holding the shape and of sanitary conditions.

3) Working Example 3

According to the method, soft state ice cream produced by the specialized ice cream maker as a precursor of hard state ice cream is poured into a cup, cone or other shape made of edible material and then frozen to −30° C. to −40° C. and then held at −15° C. to −25° C. as it is or after it has further been packed in a pillow type container of plastic film, and then it is further heated up to 0° C. to −8° C. by using an electronic range upon request of the customer. Due to this fact, the ice cream is maintained in very sanitary condition without being touched by the person other than the customers.

4) Working Example 4

Number of soft state ice creams were prepared by using retail dealer's small sized freezer regardless of customer's demand, and pour them into and above the uppermost line 1a of cone then transferred them in a storaging tank held at a temperature of −15° C. to −25° C.

Thereafter the desired number of thus storaged ice creams were taken out and heated to 0° C. to −8° C. and supplied to the customer.

What is claimed is:

1. A method of producing soft ice cream comprising pouring soft state ice cream as a precursor to hard state ice cream into either one of a cone, cup, other shape made of paper, plastics or edible material, freezing the soft state ice cream to −30° C. to −40° C. to make it a hard state ice cream, storing the hard state ice cream at −15° C. to −25° C., and rapidly heating the hard state ice cream by microwave heating to −0° C. to −8° C. to make soft ice cream.

2. The method of producing soft ice cream as claimed in claim 1 which further comprises: wrapping the ice cream filled cone, cup and other type of container made of paper, plastics or edible material into a pillow container made of paper or plastics for the purpose of keeping the shape of an ice cream filled container and for sanitary purposes, storing the pillow container at −15° C. to −25° C. and then breaking the pillow container and heating up the ice cream to 0° C. to −8° C.

3. The method as claimed in claim 2, wherein said rapid heating of the hard state ice cream occurs in a few seconds to 15 seconds.

4. The method of producing soft ice cream as claimed in claim 1 comprising: pouring the soft state ice cream into a cone or cup and then freezing the soft state ice cream to −30° C. to −40° C. to make it a hard state ice cream, and then storing the hard state ice cream at −15° C. to −25° C., then wrapping the hard state ice cream in a pillow container, and heating up the hard state ice cream to −0° C. to −8° C. and pushing out the heated ice cream from inside the container.

5. The method as claimed in claim 4, wherein said rapid heating of the hard state ice cream occurs in a few seconds to 15 seconds.

6. The method of producing soft ice cream as claimed in any one of the claims 1 to 4, wherein the final heating step heats to a temperature of 0° C. to −3° C. to make a shake ice.

7. The method as claimed in claim 6, wherein said rapid heating of the hard state ice cream occurs in a few seconds to 15 seconds.

8. The method of producing soft ice cream as claimed in any one of claims 1 to 4, wherein the final heating step heats to a temperature of −3° C. to −8° C. to make soft ice cream.

9. The method as claimed in claim 8, wherein said rapid heating of the hard state ice cream occurs in a few seconds to 15 seconds.

10. The method as claimed in claim 1, wherein said rapid heating of the hard state ice cream occurs in a few seconds to 15 seconds.

11. The method as claimed in claim 1, wherein said soft state ice cream is provided from a retail dealer's freezer.

12. A method of producing a slightly hard soft cream comprising pouring soft state ice cream into either one of a cone, cup, other shape made of paper, plastics or edible material, freezing the soft state ice cream to −30° C. to −40° C. to make it a hard state ice cream, storing the hard state ice cream at −15° C. to −25° C., and rapidly heating the hard state ice cream by microwave heating to −8° C. to −10° C. to make a slightly hard soft cream.

* * * * *